(12) United States Patent
Endo et al.

(10) Patent No.: US 11,702,131 B2
(45) Date of Patent: Jul. 18, 2023

(54) CONTROL DEVICE, DRIVE DEVICE, ELECTRIC POWER STEERING DEVICE, AND CONTROL METHOD

(71) Applicant: Nidec Corporation, Kyoto (JP)

(72) Inventors: Shuji Endo, Kyoto (JP); Hiroyuki Ishimura, Kawasaki (JP)

(73) Assignee: NIDEC CORPORATION, Kyoto (JP)

( * ) Notice: Subject to any disclaimer, the term of this patent is extended or adjusted under 35 U.S.C. 154(b) by 31 days.

(21) Appl. No.: 17/632,379

(22) PCT Filed: Aug. 6, 2020

(86) PCT No.: PCT/JP2020/030254
§ 371 (c)(1),
(2) Date: Feb. 2, 2022

(87) PCT Pub. No.: WO2021/029331
PCT Pub. Date: Feb. 18, 2021

(65) Prior Publication Data
US 2022/0289285 A1 Sep. 15, 2022

(30) Foreign Application Priority Data
Aug. 9, 2019 (JP) .................................. 2019-147464

(51) Int. Cl.
*B62D 6/00* (2006.01)
*B62D 5/04* (2006.01)

(52) U.S. Cl.
CPC ............ *B62D 6/00* (2013.01); *B62D 5/0481* (2013.01)

(58) Field of Classification Search
CPC ............................... B62D 6/00; B62D 5/0481
See application file for complete search history.

(56) References Cited

U.S. PATENT DOCUMENTS 6,107,767 A 8/2000 Lu et al.

OTHER PUBLICATIONS

Official Communication issued in International Patent Application No. PCT/JP2020/030254, dated Nov. 2, 2020.

*Primary Examiner* — Mathew Franklin Gordon
(74) *Attorney, Agent, or Firm* — Keating & Bennett

(57) ABSTRACT

A control device obtains a post-code extension steering torque by performing moving average processing of weighting an oversampling signal obtained by oversampling processing, obtains a base assist torque based on the post-code extension steering torque signal, acquires a base assist torque signal that decreases the base assist torque as a vehicle speed increases, performs stabilization processing on the base assist torque signal to obtain an assist torque signal according to the assist torque of an electric power steering device.

16 Claims, 8 Drawing Sheets

CONTROL DEVICE, DRIVE DEVICE, ELECTRIC POWER STEERING DEVICE, AND CONTROL METHOD

CROSS-REFERENCE TO RELATED APPLICATIONS

This is a U.S. national stage of application No. PCT/JP2020/030254, filed on Aug. 6, 2020, with priority under 35 U.S.C. § 119(a) and 35 U.S.C. § 365(b) being claimed from Japanese Patent Application No. 2019-147464, filed on Aug. 9, 2019, the entire disclosures of which are hereby incorporated herein by reference.

1. Field of the Invention

The present disclosure relates to a control device that controls driving of an electric power steering device, a drive device controlled by the control device, an electric power steering device including the drive device, and a control method.

2. Background

In an electric power steering device (EPS) using a motor as a drive source, a torque ripple (pulsation) is generated due to an electrical or mechanical factor. When such a torque ripple occurs, abnormal noise occurs or steering feeling of the vehicle is deteriorated. Therefore, it is required to reduce such a torque ripple.

Conventionally, in a motor of an electric power steering device which is considered to have a small torque ripple, a torque ripple of about 0.2 Nm occurs, and in recent years, a higher level is required to suppress the torque ripple to the order of 0.01 Nm. As a method of reducing the torque ripple, there is a method of improving a structure of a motor or a method of improving a control technique.

In such a situation, an electric power steering device that improves a control technique to reduce a torque ripple and performs current feedback control is conventionally known. The conventional electric power steering device reduces a torque ripple by a notch filter that removes a specific frequency component included in a control signal generated based on an actual current value.

However, the conventional technique may not be able to satisfy a recent high requirement level for suppression of a torque ripple.

SUMMARY

An example embodiment of a control device according to the present disclosure is a control device to control an electric power steering device. The control device includes an oversampling code extender to perform oversampling processing on a steering torque signal according to a steering torque and obtain a post-code extension steering torque by moving average processing of weighting a steering torque oversampling signal obtained by the oversampling processing, a base assist controller to obtain a base assist torque based on the post-encoding extension steering torque.

An example embodiment of a drive device according to the present disclosure includes the control device and an electric motor to be driven by the control device.

An example embodiment of an electric power steering device according to the present disclosure includes the control device, an electric motor to be driven by the control device, and an electric power steering mechanism to be driven by the electric motor.

An example embodiment of a control method according to the present disclosure is a control method to control an electric power steering device. The control method includes performing oversampling processing on a steering torque signal according to a steering torque, obtaining a post-code extension steering torque by moving average processing of weighting a steering torque oversampling signal obtained by the oversampling processing, obtaining a base assist torque based on the post-encoding extension steering torque.

The above and other elements, features, steps, characteristics and advantages of the present disclosure will become more apparent from the following detailed description of the example embodiments with reference to the attached drawings.

DETAILED DESCRIPTION

Hereinafter, control devices according to example embodiments of the present disclosure will be described with reference to the drawings. Note that the scope of the present disclosure is not limited to the example embodiments described below, but includes any modification thereof within the scope of the technical idea of the present disclosure. Further, in the following drawings, to easily understand each component, a scale, the number, etc., of each structure may be different from those of actual structures.

Figure 1:
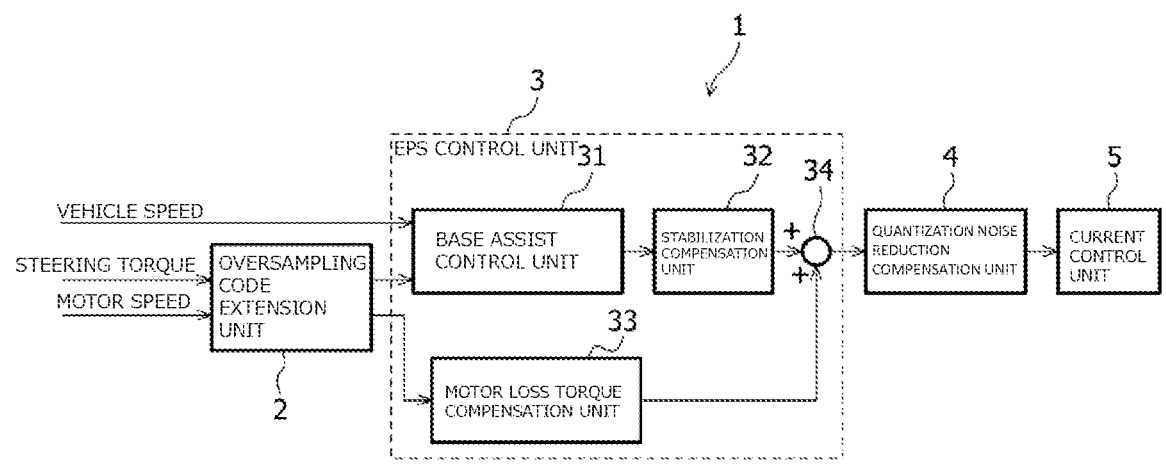
FIG. 1 is a block diagram illustrating a configuration of a control device according to an example embodiment of the present disclosure.

A configuration of a control device 1 according to an example embodiment of the present disclosure will be described in detail below with reference to FIG. 1.

The control device 1 controls driving of an electric power steering mechanism described later. The control device 1 is configured or programmed to include an oversampling code extender 2, an EPS controller 3, a quantization noise reduction compensator 4, and a current controller 5. EPS stands for Electric Power Steering.

The oversampling code extender 2 performs oversampling code extension processing on each of a steering torque signal corresponding to an input steering torque and a motor speed signal corresponding to a motor speed to obtain a post-code extension steering torque signal and a post-code extension motor speed signal. The oversampling code extender 2 outputs the obtained post-code extension steering torque signal to a base assist controller 31 of the EPS controller 3, and outputs the obtained post-code extension motor speed signal to a motor loss torque compensator 33 of the EPS controller 3. The configuration of the oversampling code extender 2 will be described later in detail with reference to FIG. 2.

The EPS controller 3 obtains an assist torque of the electric power steering device based on a vehicle speed signal corresponding to the input vehicle speed and the post-code extension steering torque signal and the post-code extension motor speed signal input from the oversampling code extender 2, and performs control to compensate for the obtained assist torque. The EPS controller 3 includes a base assist controller 31, a stabilization compensator 32, a motor loss torque compensator 33, and an adder 34.

The base assist controller 31 obtains a base assist torque based on the input vehicle speed signal and the post-code extension steering torque signal input from the oversampling code extender 2. The base assist controller 31 previously stores, for example, a table in which the vehicle speed, the steering torque, and the base assist torque are associated with each other, and refers to this table to obtain the base assist torque associated with the vehicle speed indicated by the input vehicle speed signal and the steering torque indicated by the post-code extension steering torque signal input from the oversampling code extender 2. The base assist controller 31 outputs a base assist torque signal corresponding to the base assist torque thus obtained to the stabilization compensator 32.

The stabilization compensator 32 performs phase compensation by combining a plurality of phase lead compensation and phase lag compensation for the process of advancing the phase of the base assist torque signal input from the base assist controller 31. The stabilization compensator 32 dynamically changes the frequency characteristic of the phase compensation according to the steering state and the traveling vehicle speed. The stabilization compensator 32 executes the stabilization process to obtain the assist torque of the electric power steering device, and outputs the assist torque signal corresponding to the obtained assist torque to the adder 34.

The motor loss torque compensator 33 obtains a motor loss torque compensation torque that compensates for the assist torque of the electric motor based on the post-code extension motor speed signal input from the oversampling code extender 2. The motor loss torque compensator 33 outputs a motor loss torque compensation torque signal corresponding to the obtained motor loss torque compensation torque to the adder 34. Details of the configuration of the motor loss torque compensator 33 will be described later with reference to FIG. 3.

The adder 34 is a torque compensator that compensates for the assist torque by adding the assist torque of the assist torque signal input from the stabilization compensator 32 and the motor loss torque compensation torque of the motor loss torque compensation torque signal input from the motor loss torque compensator 33. The adder 34 outputs an assist torque signal corresponding to the compensated assist torque to the quantization noise reduction compensator 4.

The quantization noise reduction compensator 4 reduces quantization error included in the assist torque signal input from the adder 34 with an IIR (Infinite Impulse Response) filter or the like, and outputs the assist torque signal with the quantization error reduced to the current controller 5. IIR stands for Infinite Impulse Response.

The current controller 5 calculates a drive current of the electric motor based on the assist torque signal input from the quantization noise reduction compensator 4. The drive current calculated by the current controller 5 is output to an electric motor (not illustrated), and the electric power steering device is driven by the electric motor.

Figure 2:
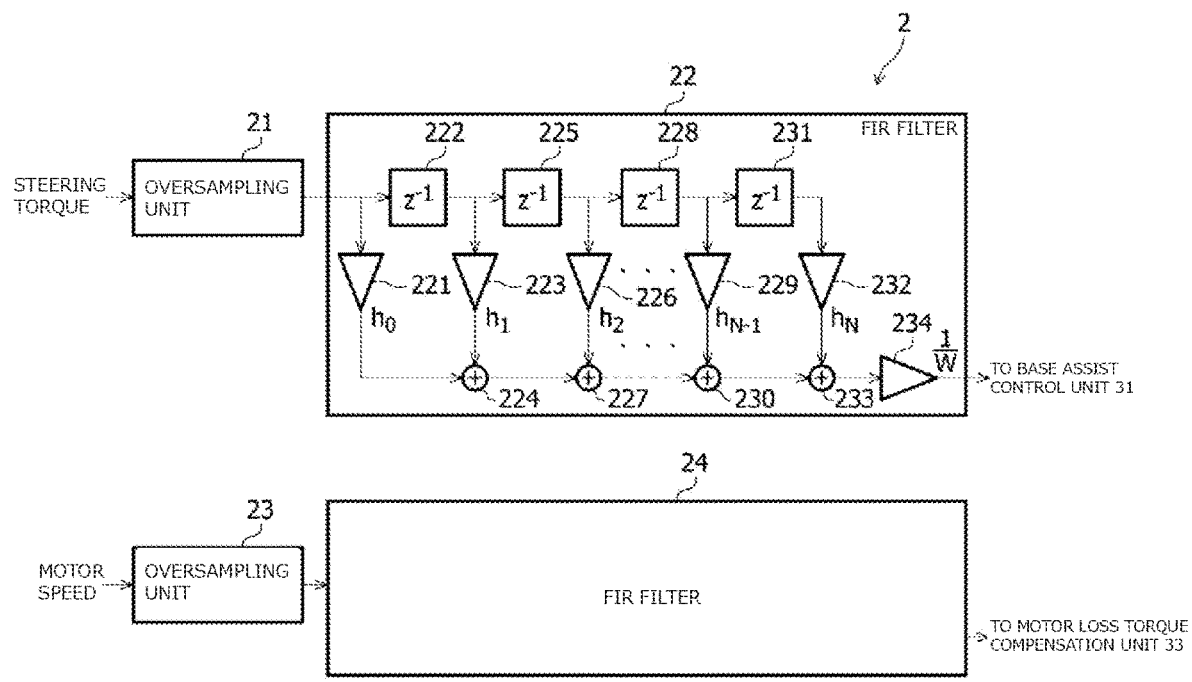
FIG. 2 is a block diagram illustrating a configuration of an oversampling code extender of a control device according to an example embodiment of the present disclosure.

A configuration of the oversampling code extender 2 of the control device 1 according to the present example embodiment of the present disclosure will be described in detail below with reference to FIG. 2.

The oversampling code extender 2 includes an oversampling unit 21, a FIR (Finite Impulse Response) filter 22, an oversampling unit 23, and an FIR filter 24.

The oversampling unit 21 oversamples the input steering torque signal that is an analog signal or a digital signal to generate a steering torque oversampling signal that is a digital signal, and outputs the generated steering torque oversampling signal to the FIR filter 22. The oversampling unit 21 oversamples the steering torque signal at a cycle faster than the control cycle at the time of controlling the assist torque. For example, the oversampling cycle is 200 μsec when the control cycle for controlling the assist torque is 1 msec.

The FIR filter 22 performs moving average processing (weighted moving average processing) of weighting the steering torque oversampling signal input from the oversampling unit 21, thereby controlling the gain and the phase of the steering torque oversampling signal to obtain a post-code extension steering torque signal. The FIR filter 22 outputs the obtained post-code extension steering torque signal to the base assist controller 31.

The oversampling unit 23 oversamples the input motor speed signal to generate a motor speed oversampling signal, and outputs the generated motor speed oversampling signal to the FIR filter 24. The oversampling unit 23 oversamples the motor speed signal with a cycle faster than the control cycle for controlling the assist torque. For example, the oversampling cycle is 200 μsec when the control cycle for controlling the assist torque is 1 msec.

The FIR filter 24 performs moving average processing of weighting the motor speed oversampling signal input from the oversampling unit 23 to control the gain and the phase of the motor speed oversampling signal to obtain a post-code extension motor speed signal. The FIR filter 24 outputs the obtained post-code extension motor speed signal to the motor loss torque compensator 33.

Here, the FIR filter 22 and the FIR filter 24 have the same configuration, and include a multiplier 221, a register 222, a multiplier 223, an adder 224, a register 225, a multiplier 226, an adder 227, a register 228, a multiplier 229, an adder 230, a register 231, a multiplier 232, an adder 233, and a multiplier 234. Note that, in FIG. 2, all the registers, multipliers, and adders included in the FIR filters 22 and 24 are not illustrated. For example, " . . . " mentioned between the registers 225 and 228 indicates that there are a predetermined number of registers between the registers 225 and 228. The " . . . " between the multipliers 226 and 229 also indicates that there is a predetermined number of multipliers between the multipliers 226 and 229. The " . . . " between the adders 227 and 230 also indicates that there is a predetermined number of multipliers between the adders 227 and 230.

The multiplier 221 multiplies an input signal x[n] from the oversampling unit 21 or the oversampling 23 by a weighting coefficient $h_0$ and outputs the multiplied signal to the adder 224.

The register 222 adds a delay of one sampling cycle to the input signal x[n] from the oversampling unit 21 or the oversampling 23 and outputs the signal to the multiplier 223 and the register 225.

The multiplier 223 multiplies the output signal of the register 222 by a weighting coefficient $h_1$ and outputs the multiplied signal to the adder 224.

The adder 224 adds the output signal of the multiplier 221 and the output signal of the multiplier 223 and outputs the result to the adder 227.

The register 225 adds a delay of one sampling cycle to the output signal of the register 222 and outputs the signal to the multiplier 226 and a register (not illustrated) of a subsequent stage.

The multiplier 226 multiplies the output signal of the register 225 by a weighting coefficient $h_2$ and outputs the result to the adder 227.

The adder 227 adds the output signal of the adder 224 and the output signal of the multiplier 226 and outputs the result to an adder (not illustrated) in a subsequent stage.

The register 228 adds a delay of one sampling cycle to the output signal of the previous register and outputs the signal to the multiplier 229 and the register 231.

The multiplier 229 multiplies the output signal of the register 228 by a weighting coefficient $h_{N-1}$ and outputs the result to the adder 230.

The adder 230 adds the output signal of the adder (not illustrated) in the previous stage and the output signal of the multiplier 229 and outputs the result to the adder 233.

The register 231 adds a delay of one sampling cycle to the output signal of the register 228 and outputs the signal to the multiplier 232.

The multiplier 232 multiplies the output signal of the register 231 by a weighting coefficient $h_N$ and outputs the result to the adder 233.

The adder 233 adds the output signal of the adder 230 and the output signal of the multiplier 232 and outputs the result to the multiplier 234.

The multiplier 234 outputs an output signal y[n] obtained by multiplying the output signal of the adder 233 by 1/w to the base assist controller 31 or the motor loss torque compensator 33. w is a total value obtained by summing (adding) the weighting coefficients $h_0$ to $h_N$.

Figure 3:
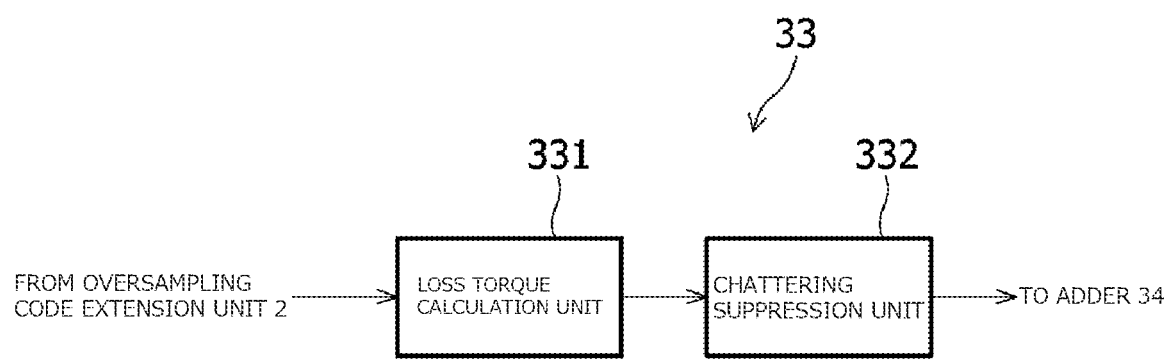
FIG. 3 is a block diagram illustrating a configuration of a motor loss torque compensator of an EPS controller of a control device according to an example embodiment of the present disclosure.

The configuration of the motor loss torque compensator of the control device 1 according to the present example embodiment of the present disclosure will be described in detail below with reference to FIG. 3.

The motor loss torque compensator 33 includes a loss torque calculation unit 331 and a chattering suppression unit 332.

The loss torque calculation unit 331 obtains motor loss torque compensation torque based on the post-code extension motor speed signal input from the oversampling code extender 2. Here, the motor loss torque compensation torque is a torque that compensates for a torque in advance in a range that does not become a torque even if a current flows to the electric motor by a magnetic attraction force or the like. The loss torque calculation unit 331 outputs a motor loss torque compensation torque signal corresponding to the obtained torque to the chattering suppression unit 332.

The chattering suppression unit 332 suppresses the chattering caused in the torque signal input from the loss torque calculation unit 331 by a low pass filter or the like and outputs the signal to the adder 34.

Figure 4:
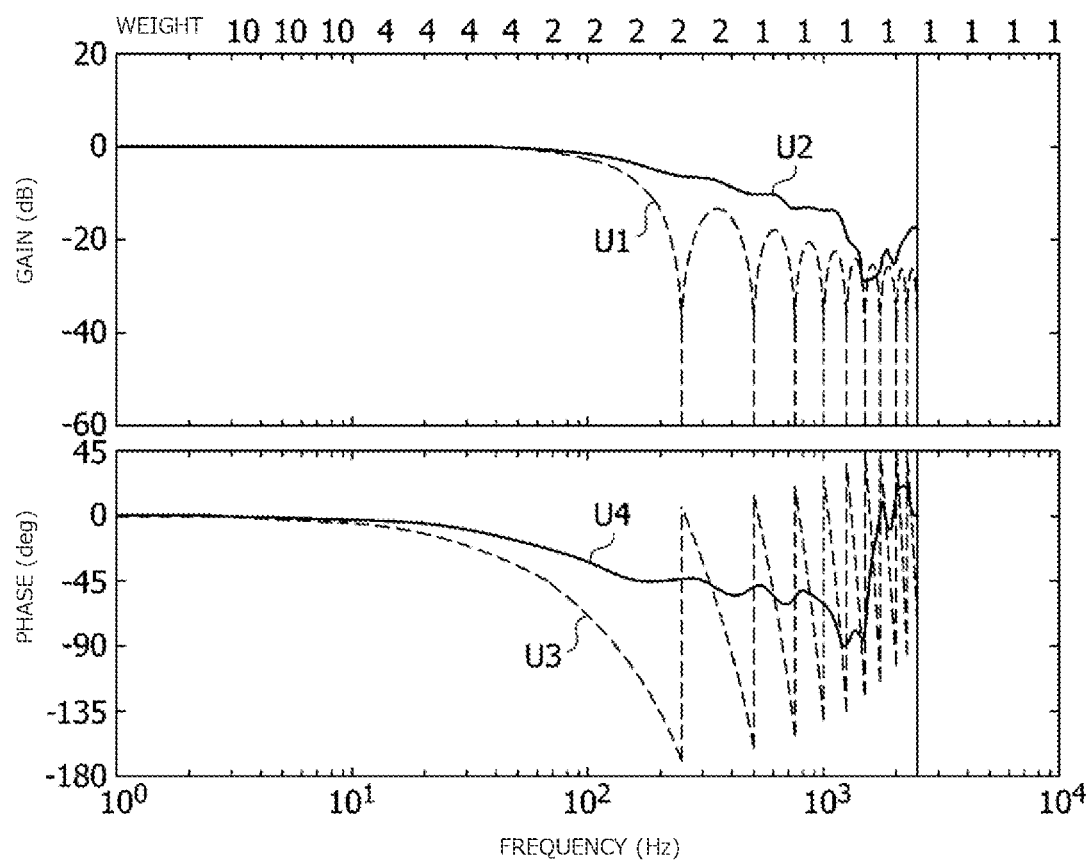
FIG. 4 is a diagram explaining processing in an oversampling code extender of the control device according to an example embodiment of the present disclosure.

The operation of the oversampling code extender 2 of the control device 1 according to the present example embodiment of the present disclosure will be described in detail below with reference to FIG. 4.

The FIR filter 22 and the FIR filter 24 of the oversampling code extender 2 can adjust the gain characteristic and the phase characteristic by adjusting the weighting factor and increase the weight by multiplying the oversampling signal that is the input signal by a larger weighting coefficient $(h_0 > h_1 > h_2 > \ldots > h_{N-1} > h_N)$ as the oversampling signal is latest, and perform the weighted moving average processing on the oversampling signal. As a result, as illustrated in FIG. 4, the FIR filter 22 or the FIR filter 24 can reduce the notch generated in a gain U2 of the post-code extension steering torque signal and the post-code extension motor speed signal which are the output signals obtained by the weighted moving average processing as compared with the gain U1 of the post-code extension steering torque signal and the post-code extension motor speed signal obtained by the moving average, and can reduce the delay of a phase U4 of the post-code extension steering torque signal and the post-code extension motor speed signal obtained by the weighted moving average processing as compared with a phase U3 of the post-code extension steering torque signal and the post-code extension motor speed signal obtained by the moving average processing. Since the FIR filter has a higher filter order than the IIR filter having the same cutoff frequency, it has an advantage that the degree of freedom of adjustment of the gain characteristic and the phase characteristic is large.

There is a trade-off relationship between the controllability of the electric power steering device and the noise sensitivity. In order to suppress high-frequency noise caused by quantization error components and the like that are brought to the high-frequency band due to sensor noise and differential characteristics in assist control, it is necessary to increase the attenuation characteristics of the low-pass filter. However, at the same time as increasing the damping characteristics, the phase delay also increases. As the phase delay increases, a control delay, that is, a steering delay occurs, which causes a problem that the driver feels the steering feeling viscous. Therefore, in the present invention, the trade-off relationship between the controllability of the electric power steering device and the noise sensitivity is eliminated by devising the weighting coefficient of the FIR filter.

For example, the assist control band of the electric power steering device is set to be up to 80 Hz. This reduces the phase delay up to 100 Hz and configures an FIR filter with sufficient attenuation near the Nyquist frequency of −3 to −10 dB, which is a trade-off between controllability and noise sensitivity of the electric power steering device. You will be able to break the relationship. The Nyquist frequency is half the frequency of oversampling.

As described above, the oversampling code extender 2 oversamples the steering torque signal or the motor speed signal with a cycle faster than the control cycle at the time of controlling the assist torque, and performs the weighted moving average processing, so that it is possible to reduce the sensor noise of the AD converter or the like, and to increase the resolution of the digital signal used in the EPS controller 3 from, for example, 12 bits to about 15 bits.

The design method of the filter coefficient in the FIR filter will be described in detail below.

First, the cutoff frequency in the FIR filter is set. This cutoff frequency is usually about 10 times higher than the control band of the electric power steering device.

Subsequently, the order of the filter in the FIR filter is determined. Since the order of the filter can improve the resolution of the digital signal input by the moving average effect of the FIR filter, it can be set according to the magnitude of the resolution to be increased, that is, the number of bits to be increased. The relationship between the degree X of the filter and the number of bits Y is generally expressed by the following (Equation 1). For example, by setting the order X of the filter to 8, the number of bits Y can be obtained to be 3. That is, if the order X of the filter is set to 8, the resolution of the digital signal used in the EPS controller 3 can be increased by 3 bits.

[math 1]

$$X=2^Y \qquad \text{(Equation 1)}$$

Next, the filter coefficient of the FIR filter is calculated from the cutoff frequency and the order of the filter in the FIR filter described above. For example, the window function method is used to calculate the filter coefficient. At this time, since there is a problem that the phase delay becomes too large when all the orders of the filters are used, the order of the filters to be used is limited to half (X/2) or less. For example, in the case of a design in which the order X of the filter is 8, the order of the filter used for the calculation of the filter coefficient is 4 or less. Here, by reducing the order of the filter to half or less, there is an order of the filter that is not used in the calculation of the filter coefficient. The filter coefficient calculated by the order of this filter is set to 0.

Since the filter coefficient obtained by the above calculation of the filter coefficient does not increase the weighting coefficient for the latest input signal, there is a problem that the phase delay becomes large. Therefore, in order to increase the weighting coefficient for the latest input signal and reduce the phase lag, the filter coefficient is adjusted while maintaining the state where the sum of the filter coefficients is 1. By increasing the weighting factor of the FIR filter to the latest input signal, the phase delay is improved, but there is a problem that the gain characteristic near the Nyquist frequency has a small amount of attenuation. Here, target values are set for each of the phase characteristic and the gain characteristic, and the weighting coefficient of the FIR filter is adjusted so that the attenuation of the gain characteristic near the Nyquist frequency becomes large.

The adjustment of the weighting coefficient of this FIR filter may be obtained by an optimization process using the control system CAD.

The operation of the motor loss torque compensator 33 of the control device 1 according to the present example embodiment of the present disclosure will be described in detail below with reference to FIG. 5.

The motor loss torque compensator 33 sets, as a loss torque of the electric motor, a torque that does not become a torque even when a current flows due to a magnetic attraction force of a magnet of the electric motor or the like, and compensates for the loss torque.

Figure 5:
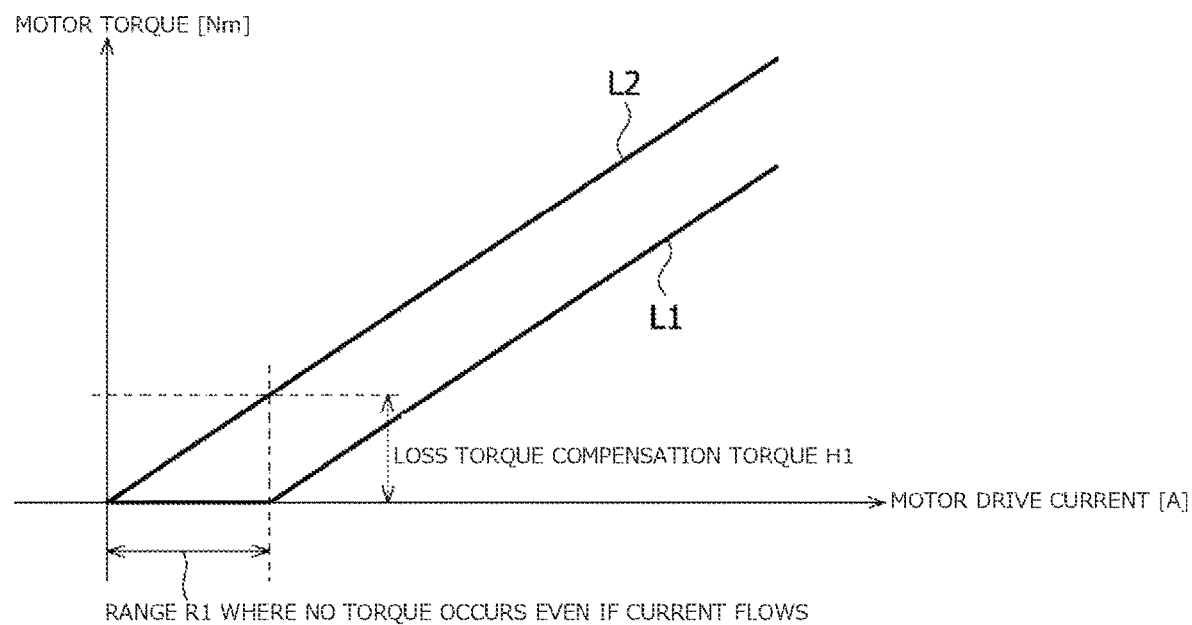
FIG. 5 is a diagram explaining processing in a motor loss torque compensator of an EPS controller of a control device according to an example embodiment of the present disclosure.

Specifically, as illustrated in FIG. 5, the motor loss torque compensator 33 compensates for the torque of the electric motor with a loss torque compensation torque H1 in a range R1 in which the torque is not obtained even if the drive current flows to the electric motor (a range in which the drive current is equal to or less than a predetermined value). As a result, a predetermined motor torque can be obtained in the range R1 of the motor drive current.

As described above, the motor loss torque compensator 33 compensates for the torque of the electric motor with the loss torque compensation torque H1 in the range R1 equal to or less than the predetermined value of the drive current, and sets the assist torque of the assist torque signal output from the EPS controller 3 to the assist torque L2 after the compensation from an assist torque L1 before the compensation, whereby the responsiveness to the instruction to generate the minute assist torque in the electric motor can be improved.

The operation of the quantization noise reduction compensator 4 of the control device 1 according to the present example embodiment of the present disclosure will be described in detail below with reference to FIG. 6.

Figure 6:
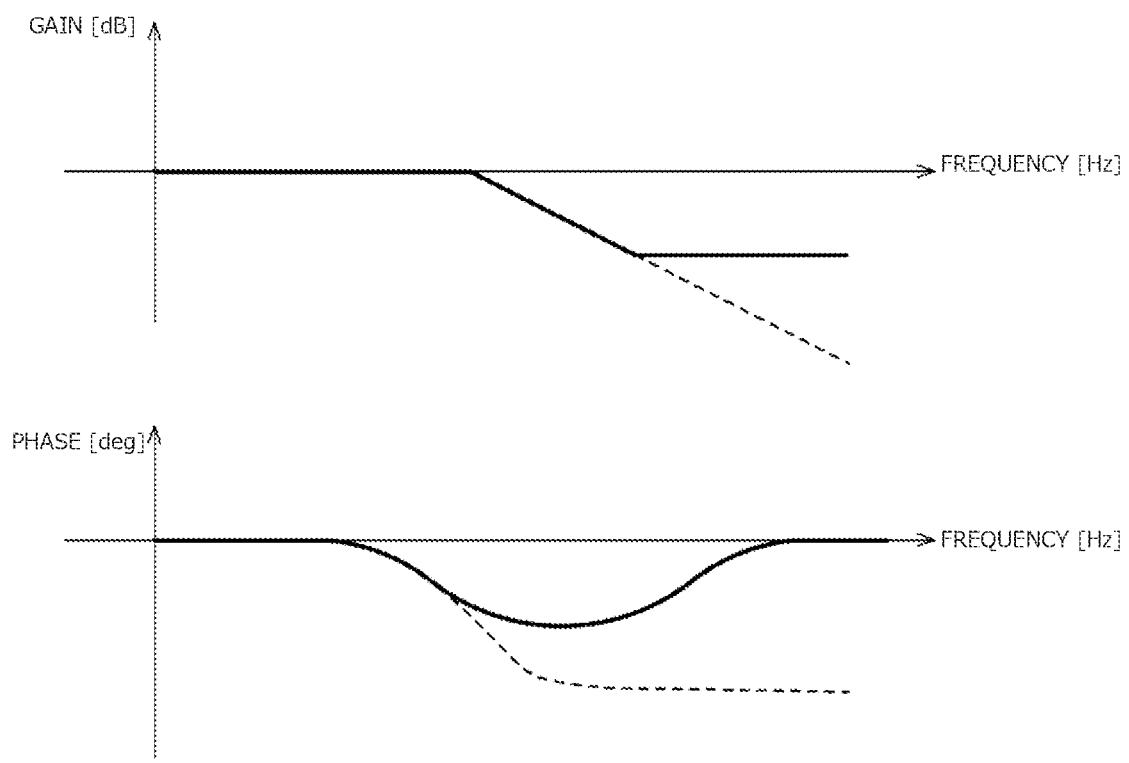
FIG. 6 is a diagram explaining processing in a quantization noise reduction compensator of a control device according to an example embodiment of the present disclosure.

As illustrated in FIG. 6, the quantization noise reduction compensator 4 decreases the gain of the assist torque signal in a frequency band higher than a predetermined frequency of the input assist torque signal. Here, the predetermined frequency is preferably a control band when controlling the assist torque, and is, for example, 100 Hz. The quantization noise reduction compensator 4 can reduce the gain in the frequency band higher than a predetermined frequency by reducing the gain by the IIR filter indicated by the solid line in FIG. 6, as compared with the case where the gain is reduced by the low pass filter indicated by the broken line in FIG. 6. Here, the predetermined frequency is, for example, 200 Hz.

As illustrated in FIG. 6, the quantization noise reduction compensator 4 performs phase delay compensation for reducing the gain in a frequency band higher than a predetermined frequency of the input assist torque signal. As a result, quantization noise (quantization error) included in the assist torque signal can be reduced. The quantization noise reduction compensator 4 performs the phase delay compensation by the IIR filter indicated by the solid line in FIG. 6, so that it is possible to suppress deterioration of stability due to an excessive decrease in phase and to delay the phase in a predetermined frequency band as compared with the case of using the low pass filter indicated by the broken line in FIG. 6.

As described above, the quantization noise reduction compensator 4 performs the phase delay compensation for reducing the gain in the frequency band higher than the predetermined frequency of the input assist torque signal, thereby reducing the quantization noise that has moved to the high-frequency band due to the differential characteristic in the processing of the EPS controller 3. That is, the quantization noise reduction compensator 4 compensates for the quantization error included in the assist torque signal by reducing the gain in the high frequency band from the predetermined frequency of the assist torque signal.

Figure 7:
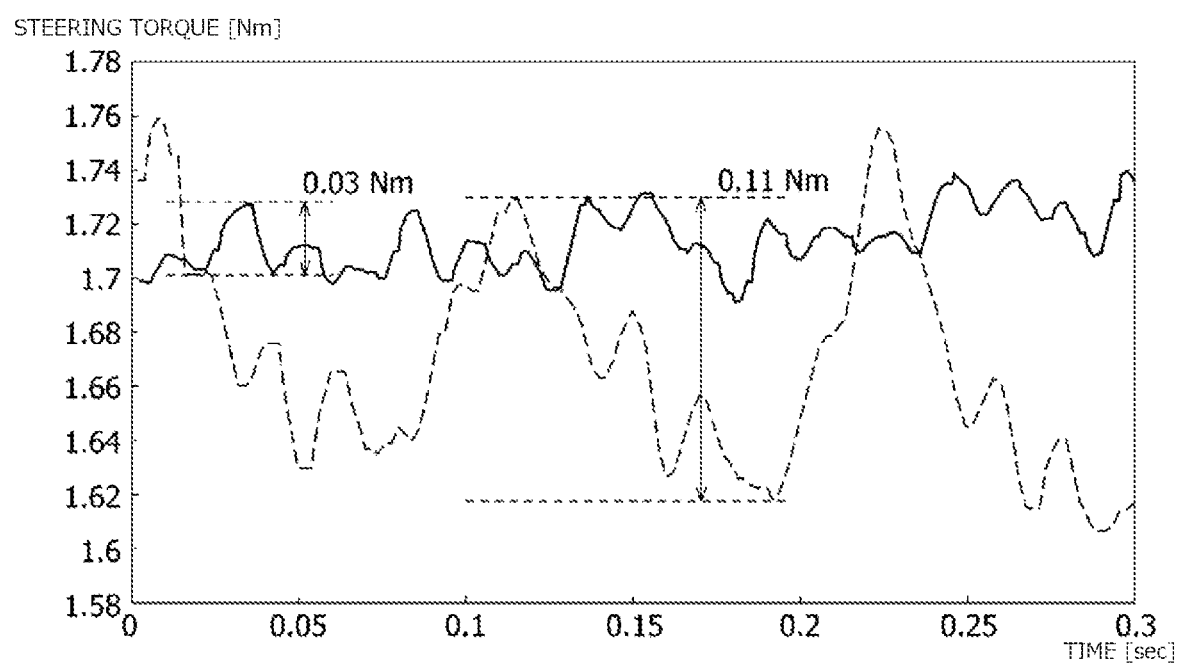
FIG. 7 is a diagram illustrating the transition of steering torque in processing of a control device according to an example embodiment of the present disclosure in comparison with the related art.

FIG. 7 is a diagram illustrating a result obtained in an experiment performed to confirm the effect of the present example embodiment. As illustrated in FIG. 7, the control device 1 can reduce the torque ripple of 0.11 Nm in the related art to 0.03 Nm by each processing in the oversampling code diffusion unit 2, the motor loss torque compensator 33, and the quantization noise reduction compensator 4.

Vehicles such as automobiles are generally equipped with a power steering device. A power steering device generates an auxiliary torque for assisting the steering torque of the steering system generated by the driver operating the steering wheel. The auxiliary torque is generated by an auxiliary torque mechanism, and can reduce the burden on the driver's operation. For example, the auxiliary torque mechanism includes a steering torque sensor, an ECU, an electric motor, a deceleration mechanism, and the like. The steering torque sensor detects the steering torque in the steering system. The ECU generates a drive signal based on the detection signal of the steering torque sensor. The electric motor generates an auxiliary torque according to the steering torque based on the drive signal, and transmits the auxiliary torque to the steering system via the reduction mechanism.

Figure 8:
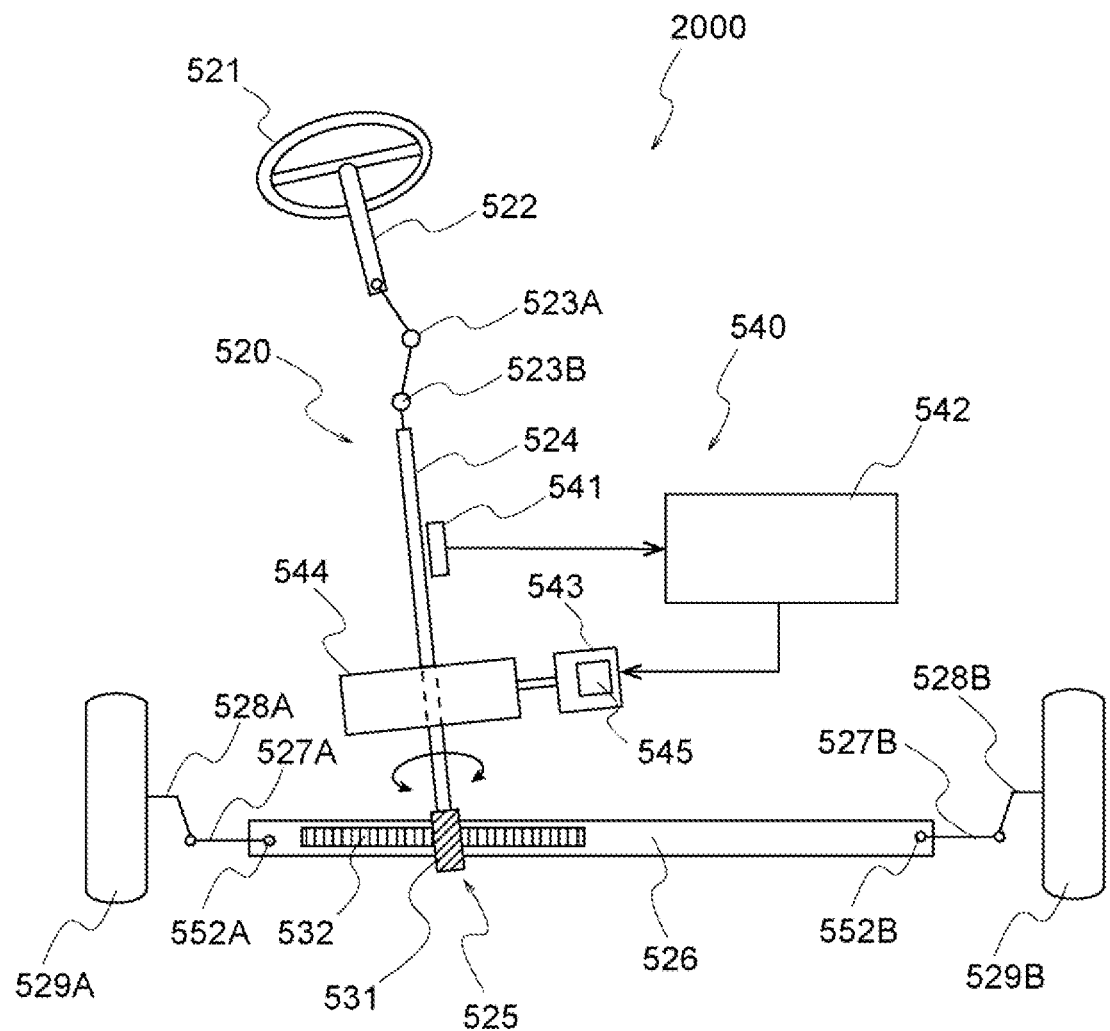
FIG. 8 is a diagram schematically illustrating a configuration of an electric power steering device according to an example embodiment of the present disclosure.

The control device 1 of the above example embodiment is suitably used for a power steering device. FIG. 8 is a diagram schematically illustrating the configuration of an electric power steering device 2000 according to the present example embodiment.

The electric power steering device 2000 includes a steering system 520 and an auxiliary torque mechanism 540.

The steering system 520 includes, for example, a steering wheel 521, a steering shaft 522 (also referred to as a "steering column"), free shaft joints 523A and 523B, and a rotation shaft 524 (also referred to as a "pinion shaft" or "input shaft").

The steering system 520 also includes, for example, a rack-and-pinion mechanism 525, a rack shaft 526, left and right ball joints 552A and 552B, tie rods 527A and 527B, knuckles 528A and 528B, and left and right steering wheels (for example, left and right front wheels) 529A and 529B.

The steering wheel 521 is connected to the rotation shaft 524 via the steering shaft 522 and the free shaft joints 523A and 523B. The rack shaft 526 is connected to the rotation shaft 524 via the rack-and-pinion mechanism 525. The rack-and-pinion mechanism 525 has a pinion 531 provided to the rotation shaft 524 and a rack 532 provided to the rack shaft 526. The right steering wheel 529A is connected to the right end of the rack shaft 526 via the ball joint 552A, the tie rod 527A and the knuckle 528A in this order. Similar to the right side, the left steering wheel 529B is connected to the left end of the rack shaft 526 via the ball joint 552B, the tie rod 527B and the knuckle 528B in this order. Here, the right side and the left side correspond to the right side and the left side as seen from the driver sitting on the seat, respectively.

According to the steering system 520, steering torque is generated when the driver operates the steering wheel 521, and is transmitted to the left and right steering wheels 529A and 529B via the rack-and-pinion mechanism 525. As a result, the driver can operate the left and right steering wheels 529A and 529B.

The auxiliary torque mechanism 540 includes, for example, a steering torque sensor 541, an ECU 542, an electric motor 543, a deceleration mechanism 544, and a power supply device 545. The auxiliary torque mechanism 540 applies auxiliary torque to the steering system 520 from the steering wheel 521 to the left and right steering wheels 529A and 529B. The auxiliary torque is sometimes referred to as "additional torque".

As the ECU 542, for example, a control circuit is used. The control device 1 of FIG. 1 is included in the ECU 542 as, for example, a microcontroller. As the power supply device 545, for example, an inverter is used. The ECU 542, the electric motor 543, and the electric power supply device 545 may define a unit generally referred to as a "mechanical and electrical integrated motor".

Of the elements illustrated in FIG. 8, the mechanism configured of the elements excluding the ECU 542, the electric motor 543, and the power supply device 545 corresponds to an example of the power steering mechanism driven by the electric motor 543.

The steering torque sensor 541 detects the steering torque of the steering system 520 applied by the steering wheel 521. The ECU 542 generates a drive signal for driving the electric motor 543 based on a detection signal from the steering torque sensor 541 (hereinafter, referred to as a "torque signal"). The electric motor 543 generates an auxiliary torque according to the steering torque based on the drive signal. The auxiliary torque is transmitted to the rotation shaft 524 of the steering system 520 via the deceleration mechanism 544. The deceleration mechanism 544 is, for example, a worm gear mechanism. Auxiliary torque is further transmitted from the rotation shaft 524 to the rack-and-pinion mechanism 525.

The power steering device 2000 is classified into a pinion assist type, a rack assist type, a column assist type, or the like, depending on the part where the auxiliary torque is applied to the steering system 520. FIG. 8 illustrates the power steering device 2000 of the pinion-assist type. However, the power steering device 2000 is also applied to the rack assist type, the column assist type, and the like.

Not only a torque signal but also a vehicle speed signal, for example, can be input to the ECU 542. The microcontroller of the ECU 542 can PWM control the electric motor 543 based on the torque signal, the vehicle speed signal, and the like.

The ECU 542 sets a target current value at least based on the torque signal. It is preferable that the ECU 542 sets the target current value in consideration of the vehicle speed signal detected by the vehicle speed sensor and further in consideration of the rotation signal of the rotor detected by the angle sensor. The ECU 542 can control the drive signal, that is, the drive current of the electric motor 543 so that the actual current value detected by the current sensor matches the target current value.

According to the power steering device 2000, the right and left steering wheels 529A and 529B can be operated by the rack shaft 526 by utilizing the combined torque obtained by adding the auxiliary torque of the electric motor 543 to the steering torque of the driver.

In the above, a power steering device is mentioned as an example of the usage in the control device of the present disclosure, but the usage of the control device of the present disclosure is not limited to those described above. It is applicable to a wide range including a pump, a compressor or the like.

As described above, according to the present example embodiment, there are provided the oversampling code extender 2 that performs the oversampling processing on the steering torque signal according to the steering torque and obtains the post-code extension steering torque by the moving average processing of weighting the steering torque oversampling signal obtained by the oversampling processing, the base assist controller 31 that obtains the base assist torque based on the post-encoding extension steering torque and obtains the base assist torque signal that decreases the base assist torque as the vehicle speed increases, the stabilization compensator 32 that obtains the assist torque signal according to the assist torque of the electric power steering device by performing the stabilization processing on the base assist torque signal, and the quantization noise reduction compensator 4 that compensates for the quantization error included in the assist torque signal by decreasing the gain in the frequency band higher than the predetermined frequency of the assist torque signal, thereby reducing the torque ripple, so that it is possible to realize comfortable driving for the driver.

It is to be considered that the example embodiments described above are illustrative in all aspects, and are not restrictive. The scope of the present disclosure is shown not by the above-described example embodiments but by the scope of the claims, and is intended to include all changes within the meaning and scope equivalent to the scope of claims.

Features of the above-described preferred example embodiments and the modifications thereof may be combined appropriately as long as no conflict arises.

Additionally, a part or whole of the control device 1 and/or the functional units or blocks thereof as described above with respect to the various preferred embodiments of the present invention be implemented in one or more circuits or circuitry, such as an integrated circuit(s) or as an LSI (large scale integration). Each functional unit or block of the control device may be individually made into an integrated circuit chip. Alternatively, part or whole of the functional units or blocks may be integrated and made into an integrated circuit chip. Additionally, the method of forming a circuit or circuitry defining the control device 1 is not limited to LSI, and an integrated circuit may be implemented by a dedicated circuit or a general-purpose processor or controller that is specifically programmed to define a special-purpose processor or controller. Further, if technology of forming an integrated circuit, which replaces LSI, arises as a result of advances in semiconductor technology, an integrated circuit formed by that technology may be used.

Furthermore, a program which is operated in the control device 1 and/or other elements of various preferred embodiments of the present invention, is a program (program causing a computer to perform a function or functions) controlling a CPU, Control Unit, Controller, Control Circuit, Processor, Microprocessor, Processor Circuit, etc. in order to realize functions of the various preferred embodiments according to the present invention, including each of the various circuits or circuitry described herein and recited in the claims. Therefore, information which is handled by the control device 1 is temporarily accumulated in a RAM at the time of the processing. Thereafter, the information is stored in various types of circuitry in the form of ROMs and HDDs, and is read out by circuitry within, or included in combination with, the control device 1 as necessary, and modification or write-in is performed thereto. As a recording medium storing the program, any one of a semiconductor medium (for example, the ROM, a nonvolatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions of the various preferred embodiments of the present invention are not only realized, but the functions of preferred embodiments of the present invention may be realized by processing the loaded program in combination with an operating system or other application programs, based on an instruction of the program.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A control device to control an electric power steering device, the control device comprising:
   an oversampling code extender to perform oversampling processing on a steering torque signal according to a steering torque and obtain a post-code extension steering torque by moving average processing of weighting a steering torque oversampling signal obtained by the oversampling processing; and
   a base assist controller to obtain a base assist torque based on the post-encoding extension steering torque.

2. The control device according to claim 1, wherein the base assist controller obtains a base assist torque signal that decreases the base assist torque as a vehicle speed increases.

3. The control device according to claim 1, further comprising:
   a stabilization compensator that performs stabilization processing on the base assist torque signal to obtain an assist torque signal corresponding to an assist torque of the electric power steering apparatus by performing phase compensation that combines a plurality of phase lead compensation and phase delay compensation for the base assist torque signal.

4. The control device according to claim 1, further comprising:
   a quantization noise reduction compensator that compensates for a quantization error included in the assist torque signal by reducing a gain in a frequency band higher than a predetermined frequency of the assist torque signal.

5. The control device according to claim 1, further comprising:
   a motor loss torque compensator to obtain a motor loss torque compensation torque that compensates for the assist torque lost when a drive current to drive an electric motor of the electric power steering device is equal to or less than a predetermined value; and
   a torque compensator to compensate for the assist torque obtained by the stabilization compensator with the motor loss torque compensation torque; wherein
   the oversampling code extender performs the oversampling processing on a motor speed signal corresponding to a speed of the electric motor, and acquires a post-code extension motor speed signal by moving average processing of weighting a motor speed oversampling signal obtained by the oversampling processing;
   the motor loss torque compensator obtains the motor loss torque compensation torque based on the post-code extension motor speed signal; and
   the quantization noise reduction compensator compensates for the quantization error included in the assist torque signal corresponding to the assist torque compensated by the torque compensator.

6. The control device according to claim 5, wherein the motor loss torque compensator suppresses chattering that occurs when the motor loss torque compensation torque is obtained.

7. The control device according to claim 1, wherein the oversampling code extender performs the oversampling processing with a cycle faster than a control cycle in controlling the assist torque.

8. The control device according to claim 1, wherein the oversampling code extender executes the moving average processing with a Finite Impulse Response filter.

9. The control device according to claim 8, wherein the FIR filter has an attenuation of −3 to −10 dB having a gain characteristic near a Nyquist frequency.

10. The control device according to claim 1, wherein the predetermined frequency is a control band to control the assist torque.

11. The control device according to claim 1, wherein the quantization noise reduction compensator compensates for the quantization error with an Infinite Impulse Response filter.

12. A drive device comprising:
a control device according to claim 1; and
an electric motor to be driven by the control device.

13. An electric power steering device comprising:
a control device according to claim 1;
an electric motor to be driven by the control device; and
an electric power steering mechanism to be driven by the electric motor.

14. A control method for controlling an electric power steering device, the control method comprising:
performing oversampling processing on a steering torque signal according to a steering torque;
obtaining a post-code extension steering torque by moving average processing of weighting a steering torque oversampling signal obtained by the oversampling processing;
obtaining a base assist torque based on the post-encoding extension steering torque.

15. The control method according to claim 14, comprising:
obtaining the base assist torque signal that decreases the base assist torque as a vehicle speed increases;
stabilizing the base assist torque signal to obtain an assist torque signal corresponding to an assist torque of the electric power steering device; and
compensating for a quantization error included in the assist torque signal by decreasing a gain in a frequency band higher than a predetermined frequency of the assist torque signal.

16. The control method according to claim 15, comprising:
performing the oversampling processing on a motor speed signal corresponding to a speed of an electric motor of the electric power steering device;
obtaining a post-code extension motor speed signal by moving average processing of weighting a motor speed oversampling signal obtained by the oversampling processing;
obtaining, based on the post-code extension motor speed signal, a motor loss torque compensation torque that compensates for the assist torque that is lost when a drive current for driving the electric motor is equal to or less than a predetermined value; and
compensating for the assist torque with the motor loss torque compensation torque; wherein
the quantization error included in the assist torque signal according to the compensated assist torque is compensated.

* * * * *